(12) United States Patent
Stewart et al.

(10) Patent No.: US 7,348,764 B2
(45) Date of Patent: Mar. 25, 2008

(54) COIL SWITCHING OF AN ELECTRIC GENERATOR

(75) Inventors: David B. Stewart, Cranbury, NJ (US); Timothy J. Liska, W. Simsbury, CT (US)

(73) Assignee: Ocean Power Technologies, Inc., Pennington, NJ (US)

( * ) Notice: Subject to any disclaimer, the term of this patent is extended or adjusted under 35 U.S.C. 154(b) by 124 days.

(21) Appl. No.: 11/485,691

(22) Filed: Jul. 13, 2006

(65) Prior Publication Data

US 2008/0012538 A1    Jan. 17, 2008

(51) Int. Cl.
*H02P 9/00*    (2006.01)
(52) U.S. Cl. .............................. 322/24; 322/37; 322/89
(58) Field of Classification Search .................. 322/22, 322/23, 24, 25, 37, 59, 89, 91, 99
See application file for complete search history.

(56) References Cited

U.S. PATENT DOCUMENTS

| | | | |
|---|---|---|---|
| 3,984,750 A * | 10/1976 | Pfeffer et al. ................. 363/67 |
| 4,419,618 A * | 12/1983 | Gretsch ......................... 322/7 |
| 5,912,522 A * | 6/1999 | Rivera ......................... 310/184 |
| 6,118,186 A * | 9/2000 | Scott et al. ................ 290/40 B |
| 6,124,702 A * | 9/2000 | Pinkerton et al. ............. 322/90 |
| 6,366,060 B1 * | 4/2002 | Ely et al. ....................... 322/25 |
| 7,026,794 B1 * | 4/2006 | French et al. ................. 322/90 |
| 7,053,590 B2 * | 5/2006 | Wang .......................... 322/24 |
| 7,227,340 B2 * | 6/2007 | Chen ........................... 322/24 |

* cited by examiner

*Primary Examiner*—Nicholas Ponomarenko
(74) *Attorney, Agent, or Firm*—Henry I. Schanzer, Esq

(57) ABSTRACT

An electric generator includes multiple coil sections and switches connected to the multiple coil sections for selectively interconnecting the coil sections in series, or in parallel, or in a series-parallel configuration across first and second power terminals for producing a controlled AC voltage across these power terminals. The electric generator, with its multiple coils and interconnecting switches permitting reconfiguration of the coils, enables systems subjected to widely varying conditions and forces, such as a wave energy converter (WEC), to be operated with increased efficiency. The generator may also include multiple windings which can be selectively interconnected into a wye or a delta configuration to also control the output voltage produced by the generator and increase the efficiency of the power conversion system, particularly at low values of voltage.

25 Claims, 15 Drawing Sheets

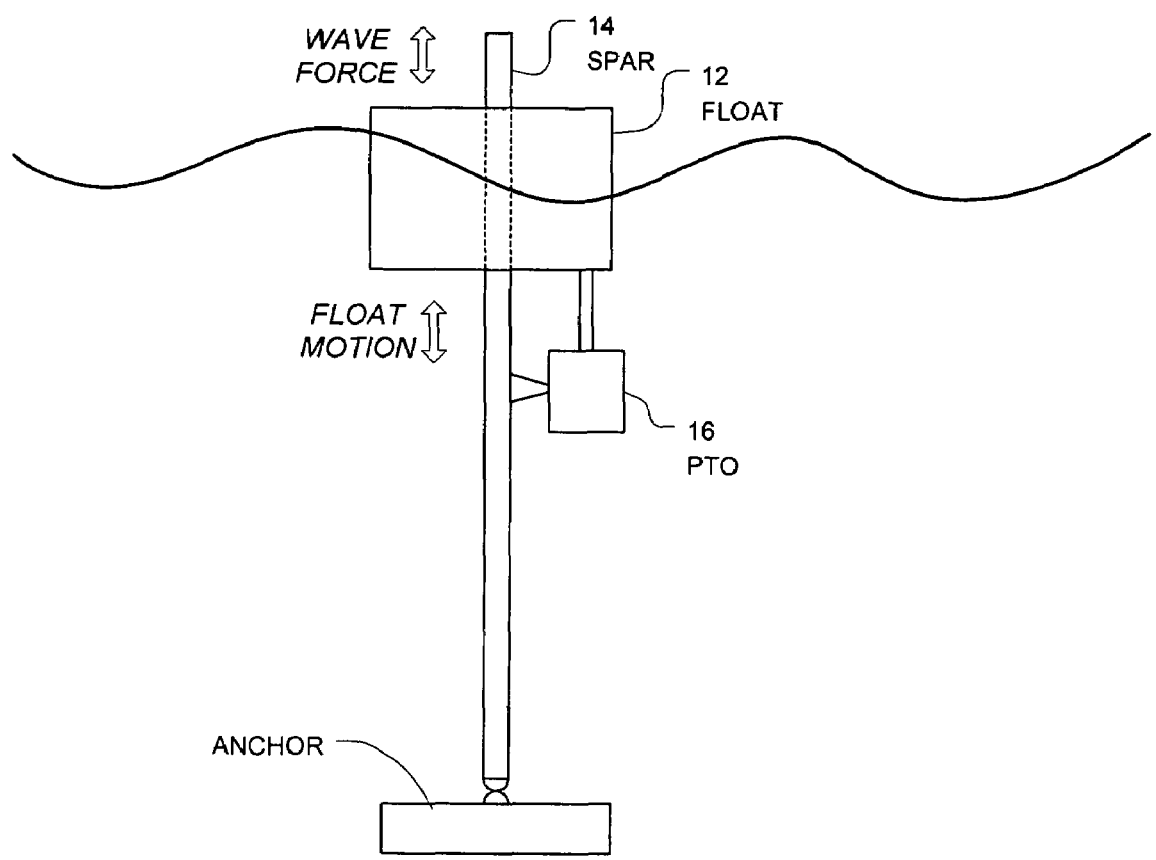
FIGURE 1A – PRIOR ART

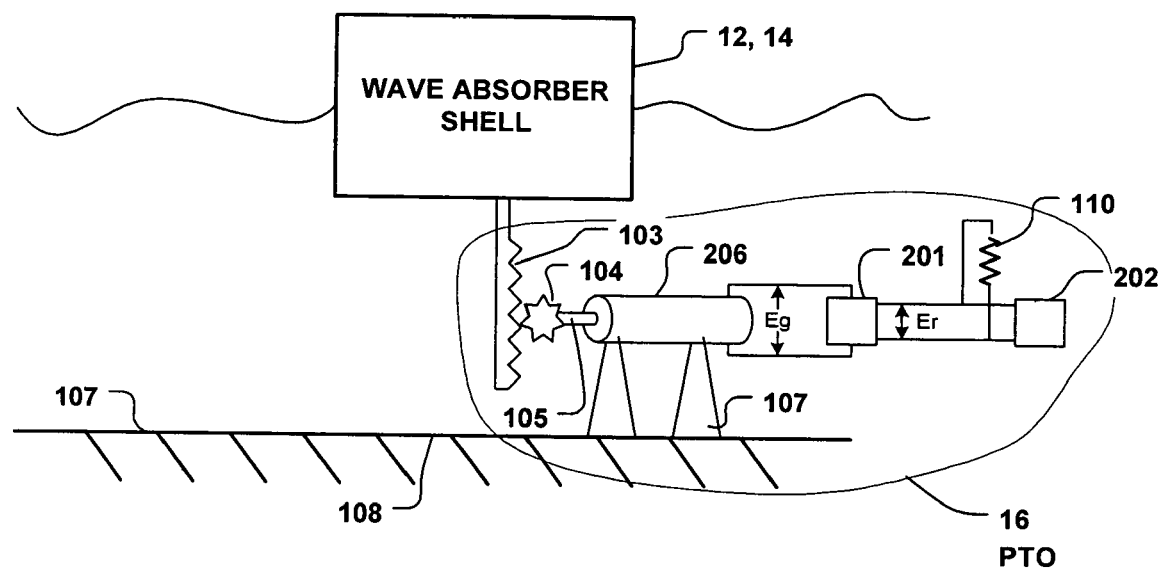
FIGURE 1B – PRIOR ART

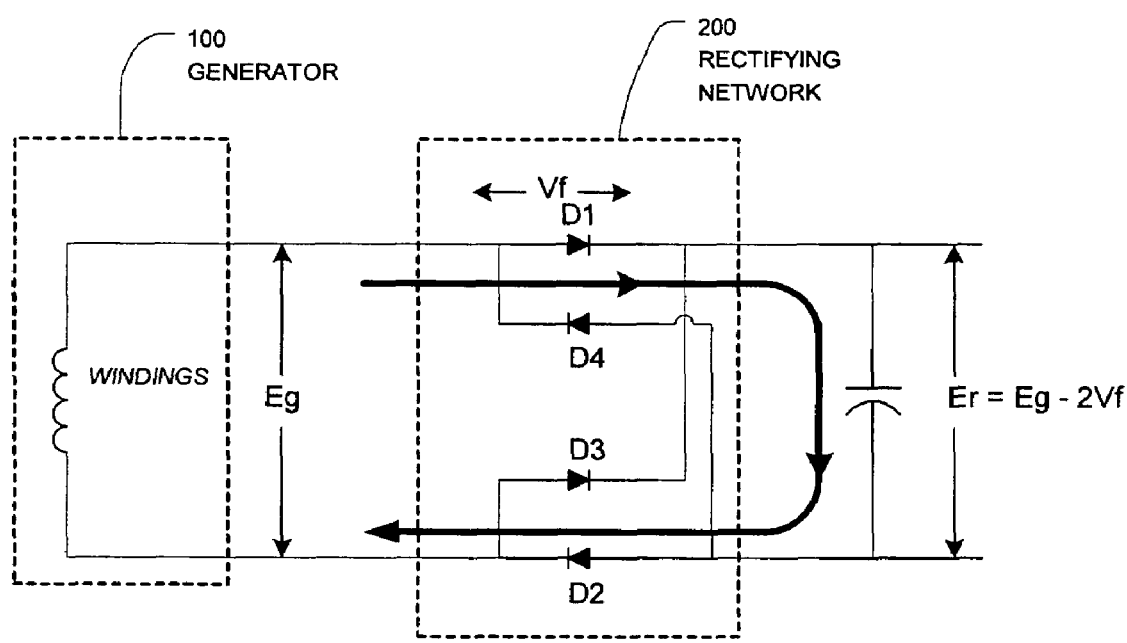
FIGURE 1C – PRIOR ART

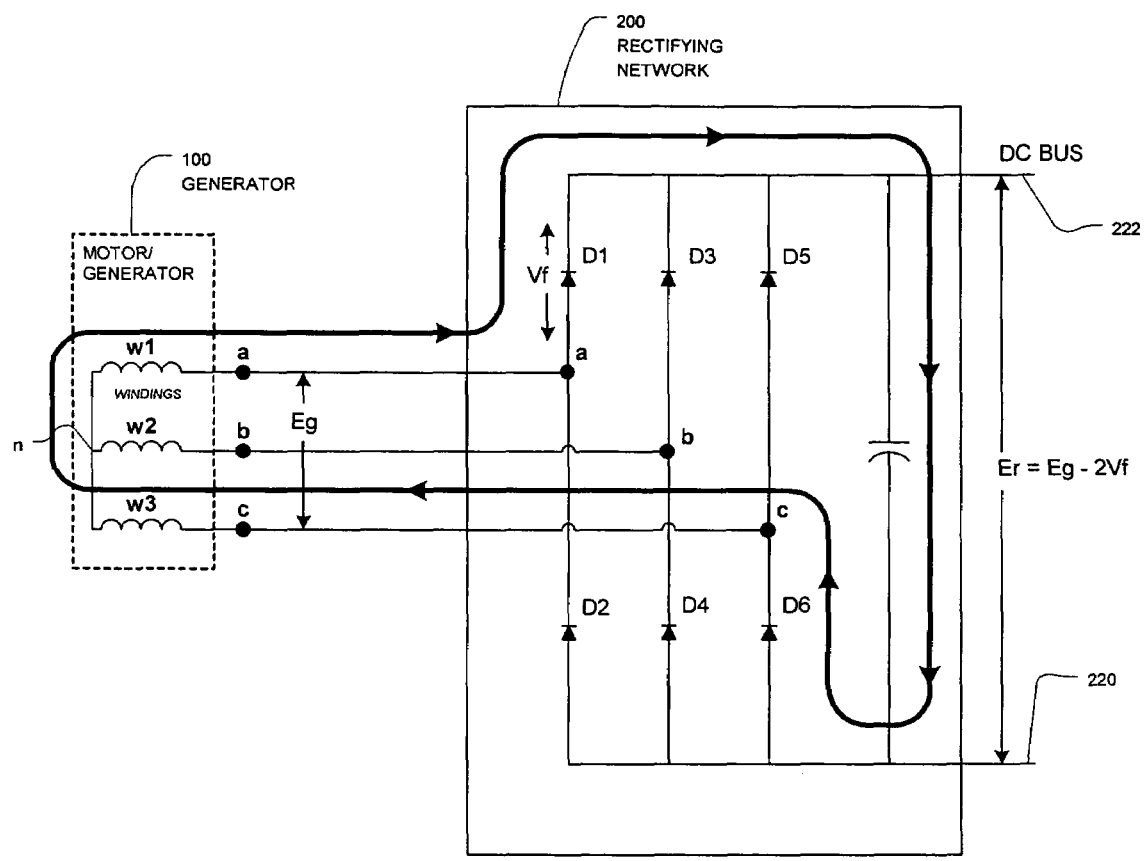
FIGURE 1D – PRIOR ART

Current flow through switches during first phase of pulse width modulation cycle

Current flow through switches during second phase of pulse width modulation cycle

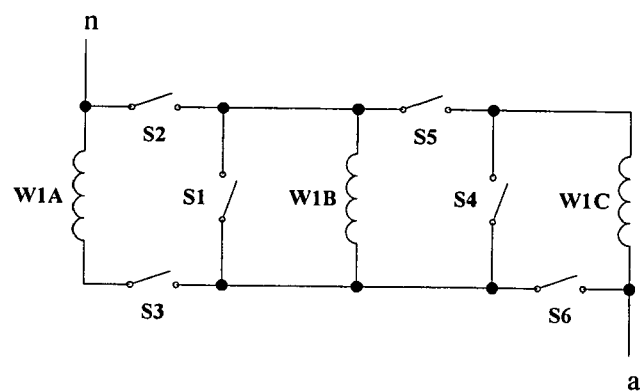
FIGURE 7A
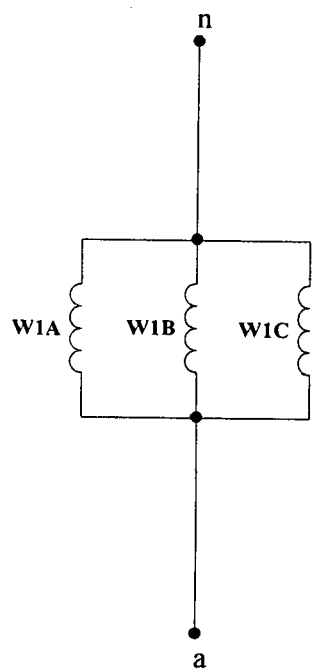
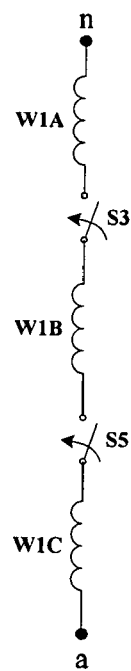
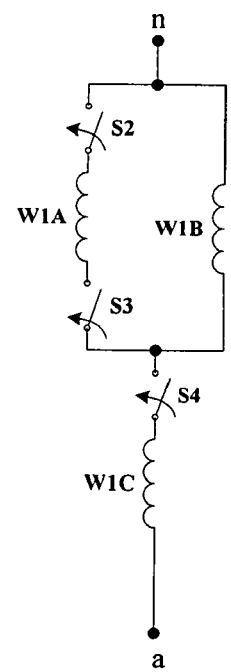
FIGURE 7B
S2, S3, S5, S6 closed
S1, S4 open
FIGURE 7C
S3, S5 closed
S1, S2, S4, S6 open
FIGURE 7D
S2, S3, S4 closed
S1, S5, S6 open

BASIC CIRCUIT

WYE CONFIGUATION CIRCUIT

DELTA CONFIGURATION CIRCUIT

COIL SWITCHING OF AN ELECTRIC GENERATOR

BACKGROUND OF THE INVENTION

This invention relates to switching the coils (windings) of an electric generator to alter the configuration of the coils of the generator in order to improve the efficiency of the generator and a system employing the generator.

The invention is of particular interest in applications where an electric generator is subjected to a wide range of operating conditions and forces such as, for example, those encountered with wave energy converters (WECs), wind turbines and, in general, any system which may be subjected to widely varying forces.

By way of example, a WEC, responsive to the motion of the waves in a body of water, may include an electric generator which is used to produce electricity in response to the motions of the waves, which can vary, in frequency and amplitude, over a very large range. Various wave energy converter (WEC) systems are known. For example, reference is made to U.S. Pat. No. 6,291,904 which issued Sep. 18, 2001, titled "Wave Energy Converter Utilizing Pressure Difference", assigned to the assignee of the present application and the teachings of which are incorporated herein by reference.

A scheme for increasing the efficiency of a WEC is shown in U.S. Pat. No. 6,731,019 titled "Apparatus and Method for Optimizing the Power Transfer Produced by a Wave Energy Converter (WEC)" assigned to the assignee of the present application and the teachings of which are incorporated herein by reference. In this patented system, the electromechanical device is controlled and its mechanical behavior is altered to increase its energy conversion efficiency by tuning the output load. Although it is known to employ WECs to generate electric power, numerous problems exist in the design of systems for efficiently harnessing the energy contained in ocean waves because the oceans waves vary very widely in frequency and amplitude over time. Power generation, conversion and conditioning equipment is typically sized large enough to handle forces and motions resulting from extreme sea conditions. A drawback with this approach is that the same equipment is oversized and inefficient when operated in low sea-state and normal conditions. This deficiency is overcome in systems embodying the invention.

A problem encountered with widely varying voltages produced by an electric generator and its rectification may be explained with reference to FIG. 1C which shows an electric generator 100 connected to a full wave rectifying network 200. The alternating current voltage Eg produced by the generator 100 is rectified by network 200 to produce a rectified voltage (d.c.) voltage Er. Now, Er is equal to Eg minus the forward voltage drops (Vf) of two diodes (i.e., D1 and D2 for one polarity of Eg; D3 and D4 for the other polarity of Eg). For ease of discussion, the forward voltage drop (Vf) of a diode may be assumed to be in the range of 1 volt. The diode drop is a constant, fixed, drop. Consequently, if, for example, Eg is 20 volts, an efficiency loss due to the diode drops is in the range of 10%. If Eg is greater, the efficiency loss due to the fixed drops decreases. However, when Eg is less than 20 volts the efficiency loss increases, above 10%. For example, If Eg were 10 volts the 2 diode drops result in an efficiency loss of 20%. Thus for low values of Eg, the losses in the power conversion stage are very significant.

Accordingly, it is an object of this invention, to reconfigure the coils (windings) of an electric generator when its output voltage would be below a certain level in order to increase the efficiency of the conversion of the generator output. By way of example, this applies to systems in which a WEC drives an electric generator and the generator output varies considerably in response to the varying sea conditions.

Reconfiguring the coils may also be used to increase the efficiency of the driving power source, and/or the efficiency of the generator itself, by providing a better match of the source impedance to the load impedance. This problem can be explained with reference to FIG. 1C which shows an electric generator 100 connected to a full wave rectifying network 200. The generator voltage, Eg, is nearly proportional to the generator speed (angular speed in the case of rotary generators, linear speed in the case of linear generator). As speed increases, so does the generator voltage, Eg. The rectified voltage, Er, is typically required to be maintained in a narrow range in order to achieve a high-efficiency and/or simplify the design of the electric load. If Er is set to handle the generator output in heavy ("energetic") sea conditions, then it is possible that the generator speed in low sea conditions will rarely reach the speed needed for Eg to be above Er as is required for the transfer of power from the waves, to the WEC, to the electric generator, and ultimately to the end user. This winding reconfiguration scheme is analogous to the shifting of a transmission in an automobile. It also enables the load to be better tuned to the source, for an improvement in overall efficiency.

Accordingly, it is an object of this invention, to reconfigure the coils (windings) of an electric generator when its output voltage would be below a certain level in order to increase the efficiency of the conversion of the driving power source.

SUMMARY OF THE INVENTION

Applicants' invention resides, in part, in the recognition of the problems discussed above, and, in part, in the use of an electric generator with multiple winding (coil) sections and switching means to selectively interconnect selected coil sections in different configurations to maximize the efficiency of the power conversion system over a wide range of operating conditions.

An electric generator embodying the invention is generally suitable for use with a WEC which includes a "float" (or "shell") and a "spar" (or "shaft" or "column" or "piston") which are designed to move relative to each other to convert the force of the waves into mechanical energy. In the discussion to follow, the float is generally depicted or referred to as the moving member and the spar as the non-moving or mechanically grounded member. However, the opposite may be the case. Alternatively, both the spar and float may move, both moving relative to each other, with the differential movement being used to produce electrical energy.

The WEC generally includes a power-take-off device (PTO) coupled between the float and the spar to convert the mechanical power available from the WEC into electrical power. The PTO device may include many different types of converters. For example, a PTO embodying the invention may include linear-to-rotary translators (e.g. rack and pinion gear assembly, ball screw assembly, hydraulic cylinder and motor assembly, or pneumatic cylinder and motor assembly) coupled to a an electric generator (which may be of the rotary type or any other suitable type of electric generator).

For a rotary electric generator, the generator rotational velocity is proportional to the differential (relative) velocity between the float and spar. In turn, the generator output voltage of the generator is approximately proportional to the rotational velocity of the generator shaft.

The output of the PTO (translator and generator) is typically fed to a power conversion system (PCS) which functions to convert the widely varying AC power to smoothed DC (or AC) power and to regulate the output of the generator to tend to optimize the wave energy-to-mechanical energy conversion efficiency of the WEC. The PCS typically includes an electric power converter that uses solid-state switches and/or devices (e.g., transistors or diodes) to control the flow of current to and/or from the generator. The power converter as used herein is sometimes referred to as a "drive", "active rectifier", "inverter", "four-quadrant converter" or "controller".

The PCS may include diodes and/or solid-state switches. The forward conduction voltage drop (Vf) of these solid-state switches/diodes when conducting (in the on state) is generally fixed, as discussed above. As a result, higher power conversion efficiency is realized when the input and output voltages of the power converter are high (20 to 100 times the switch voltage(s)). Conversely, a low power conversion efficiency is obtained when the input and/or output voltage is low.

When used in combination with a WEC, the components of the PTO are typically sized to handle the high forces and velocities (and power) that can occur in heavy sea conditions. These forces and velocities can be an order of magnitude (or more) above those experienced in normal or low sea conditions. Similarly, the components of the PCS are sized to handle the high currents and voltages (and power) that result during heavy sea conditions. In normal and low sea conditions, the generator typically rotates more slowly than its rated speed. The resultant output voltage is proportionally lower. This lower voltage does not adversely affect the electrical efficiency of the generator. However, as discussed above, it can adversely affect the efficiency of the power conversion system because of fixed voltage drops in the power conversion solid-state switches. For example, a transistor's forward conduction drop (of approximately 2 volt) is insignificant when the generator voltage is 200V. But, it becomes more and more significant as the generator voltage decreases below 20 volts. Given that two or more solid-state switches may be conducting (on) at a time, the effect of switch conduction losses is amplified.

In a system embodying the invention, selected sections of the coils may be configured and/or reconfigured to selectively cause the output voltage of the electric generator to tend to be high relative to the fixed voltage drops due to the switches in the power converter. In heavy sea conditions (high amplitude waves) tending to produce a large generator output voltage, selected sections of the generator windings may be connected in parallel in order to keep the generator output voltage within limits and to increase the current handling capability of the generator. In low sea conditions (lower amplitude waves), when the generator is rotating slowly, tending to produce a lower generator output voltage, selected sections of the generator windings may be connected in series in order to raise the generator output voltage above the fixed voltage drops of the power converter switches.

In accordance with the invention, the electric generator windings may be built with many coil (winding) sections. For example, assume a three-phase generator is constructed with four coil sections per phase. When the generator output tends to be high, the four coil sections of each phase can be connected in parallel for high-power operation (i.e., 4 coil sections connected in parallel). When the generator output tends to be low, the four coil sections can be connected in series to raise the output voltage. Alternatively, the four coil sections can be selectively interconnected to form different series and parallel combinations of the four coil sections (e.g., two branches, with each branch having two series connected coils for moderate-power, moderate voltage, operation or two coils in parallel in series with two series connected coils).

The coils may be configured and/or reconfigured by means of low ohmic impedance (e.g., mechanical relays) switches to perform the switching of the coil sections.

The generator output voltage may also be varied as a function of sea conditions by changing the generator windings from a "wye" configuration (one lead of each winding to an output terminal and the other lead of each winding connected to a common "neutral" point) to a "delta" configuration (each winding connected across two windings) and combining it with the series-parallel reconfiguration of the different coil sections.

In addition to the improvement in generator output power conversion efficiency, the invention can also improve the efficiency of the driving power source due to improved or optimized impedance matching. For example, if the coils are configured in such a way that little voltage is generated, the WEC will have to operate with more motion than is optimum in order to extract power. Similarly, if the windings are configured to generate high voltage with little WEC motion, then less than optimum power is extracted from the waves. The efficiency of the generator system can thus be improved by use of the proper selection of generator coil arrangement.

The invention is illustrated using a wave energy conversion application. However, it should be understood that the invention is equally suited for other power generation applications such as those using wind turbines and hydroelectric power, where the force of the source power is highly variable.

BRIEF DESCRIPTION OF THE DRAWINGS

In the accompanying drawings like reference characters denote like components; and FIG. 1A is a highly simplified block diagram illustrating the basic elements of a WEC;

FIG. 1B is a is a diagram (not to scale) showing some of the components of a PTO which may be used to practice the invention;

FIG. 1C is a schematic diagram to illustrate a problem faced by Applicants;

FIG. 1D is a simplified schematic diagram of a 6-diode rectifier converter circuit also illustrating a problem faced by Applicants;

FIG. 7A is a schematic diagram of switches for interconnecting a set of coils in accordance with the invention;

FIGS. 7B, 7C, 7DC are simplified schematic diagrams showing possible generator winding configurations in accordance with the invention;

DETAILED DESCRIPTION OF THE INVENTION

Figure 2:
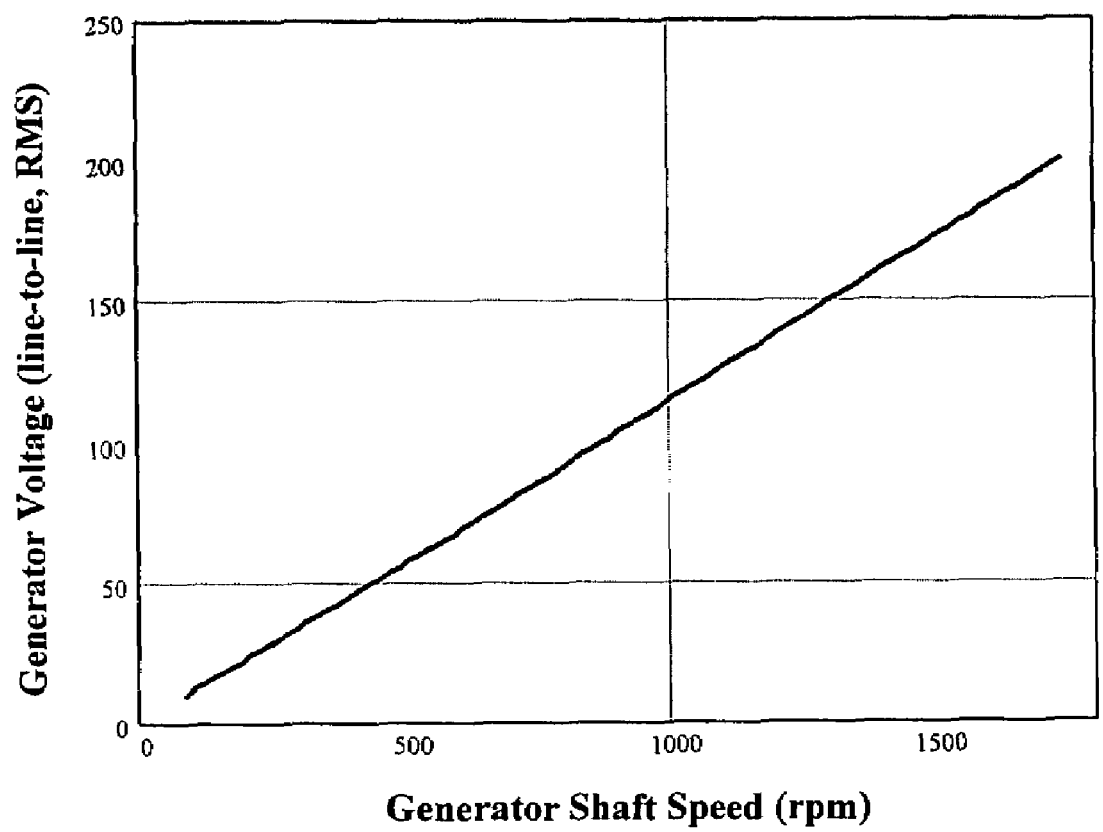
FIG. 2 is a plot showing the general relationship between a generator's output voltage and its shaft velocity.

FIGS. 1A and 1B show generalized versions of an ocean wave energy converter (WEC). A float (or shell), 12, moves up and down relative to a spar, 14, that is anchored to the sea floor. Alternatively, the spar is not anchored and may be allowed to move so as to move out of phase relative to the float. A power-take-off device (PTO), 16, coupled between the float and the spar converts the mechanical power available from the WEC into electrical power. In FIG. 1B, the PTO device includes a linear-to-rotary translator (e.g. rack and pinion gear assembly, ball screw assembly, hydraulic cylinder and motor assembly, or pneumatic cylinder and motor assembly) coupled to a rotary electric generator. In this system the generator's rotational velocity is proportional to the relative velocity between the float and spar. The output voltage, Eg, of the generator is in turn approximately proportional to the rotational velocity of the generator shaft as illustrated in FIG. 2.

As shown in FIG. 1B, the PTO, 16 includes translators 103 and 104 which drive an electric generator 206 whose output, Eg, is typically fed to a power conversion system (PCS) 201 that serves to convert the widely varying AC power (Eg) to smoothed DC power (Er) and to regulate the output of the generator in a way that optimizes the wave-energy-to-mechanical-energy conversion efficiency of the WEC. The PCS 201 typically includes an electric power converter that uses solid-state devices (e.g., diodes as shown in FIGS. 1C and 1D; or transistor switches and diodes as shown in FIG. 3) to control the flow of current to/from the generator 206.

Figure 3:
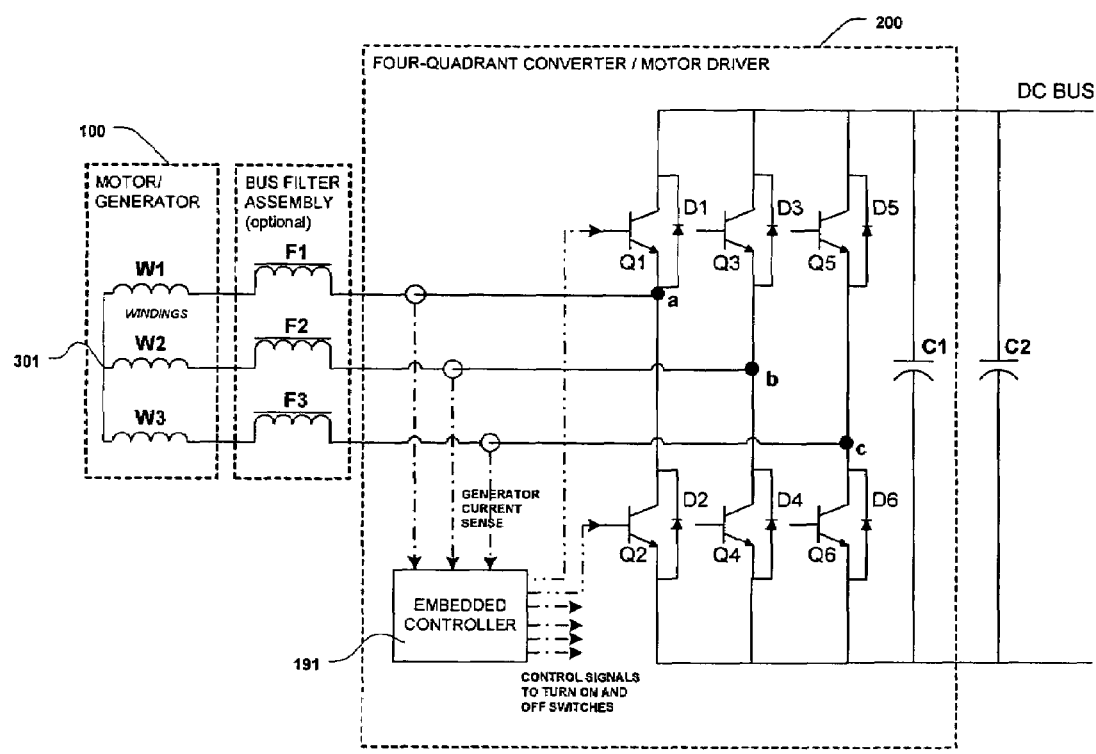
FIG. 3 is a schematic diagram of a generator converter (or drive or rectifier or inverter)

A schematic of a portion of one such power converter is shown in FIG. 3, which depicts one of several different possible implementations. In FIG. 3 the output of the electric generator 206 (identified as generator 100) is represented by a 3-phase wye connected windings (w1, w2, w3). A "wye" configuration is shown for ease of description. But, the teachings herein are equally applicable to a "delta" configuration. The 3 windings are connected in common at one (neutral) node 301. The non-common end of each winding is connected to one end of a corresponding inductor (F1, F2, F3) which is also referred to and included as a bus filter assembly. The use of separate inductors F1, F2, F3 may be optional. [Instead of separate inductors, use may be made of the inductance of the generator windings to provide the inductive function of the external inductors.] The other end of each inductor is connected to a corresponding node (a, b, c) which is connected via a rectifying diode network (e.g., a 4-quadrant power converter 200 as shown in FIG. 3) to a storage capacitor bank C1, C2. In FIG. 3, connected across each diode (D1 through D6) is a corresponding transistor switch (Q1 though Q6). In FIG. 3, transistors Q1-Q6 are shown to be bipolar transistors, but it should be evident that any other type of transistors or suitable semiconductor device may be used instead. Signals from an embedded controller 191 are used to turn transistors Q1-Q6 on and off in a phased arrangement. In the converter of FIG. 3, current in each generator phase is regulated by pulse width modulation of combinations of solid-state switches. The pulse width modulation is the same for each of the three phases and the operation will be illustrated for only one of the three phases.

Figure 4:
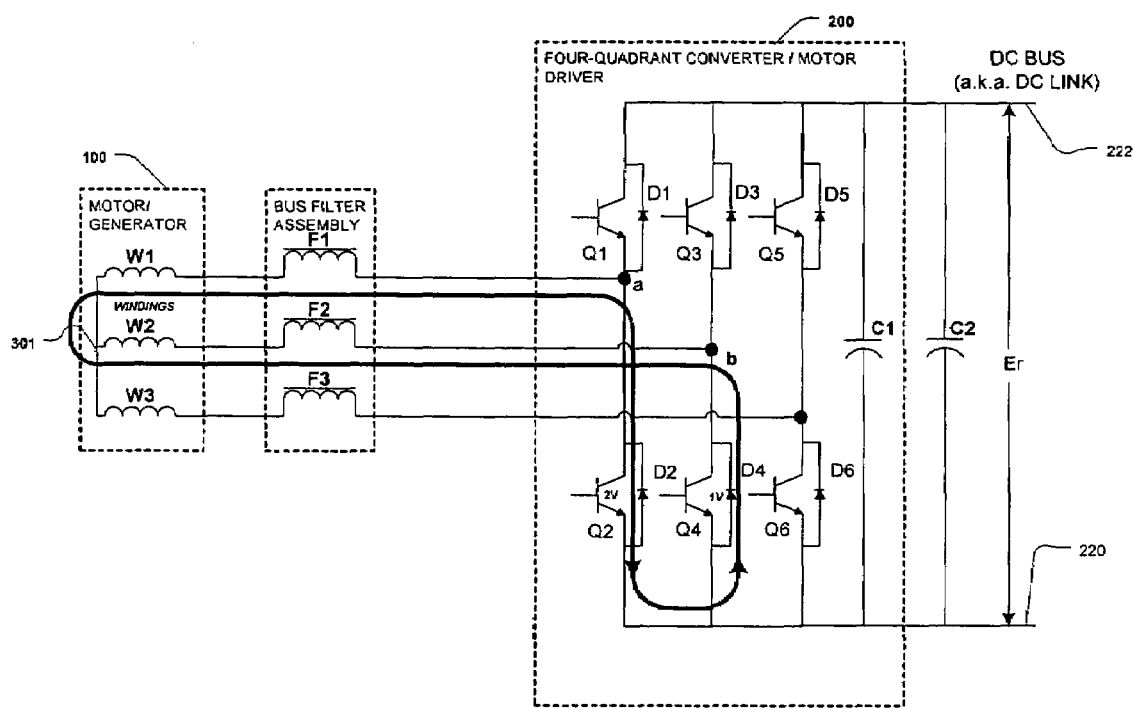
FIGS. 4 and 5 are schematic diagrams of the generator converter of FIG. 3 during two switching intervals for pulse-width-modulated (PWM) conversion.

For pulse width modulation of the converter 200 the transistor switches are turned on and off at a relatively high pulse rate (e.g., 5000 times per second) relative to the frequency (rate) of the voltage produced by the windings in response to the sea waves. The energy transfer from the windings to the storage capacitors occurs at the relatively high pulse rate (e.g., 5000 cycles or pulses per second) in two stages. In the first stage of each pulse (or cycle) energy from the generator (the windings w1, w2, w3) is stored in the inductors (F1, F2, F3), due to current conduction in the loop, as shown in FIG. 4 (for the condition of Q2 being turned on). In the second stage/portion of each pulse the energy stored in the inductors is transferred to the storage capacitors (C1, C2), as shown in FIG. 5 (for the condition of Q2 being turned off).

To illustrate the above in slightly greater detail, assume that, as shown in FIG. 4, transistor Q2 is turned on and all the other transistors are turned off. Thus, for one stage of the PWM phase when Q2 is turned on, energy from the generator (winding w1 and w2) is stored in the top two inductors (F1, F2) of the bus filter. In this first portion of the PWM phase, generator phase current passes from winding w1 through F1 then transistor Q2 and diode D4 and then through F2 and winding w2.

The second stage/portion occurs when Q2 is turned off and all the other transistors are also turned off. (Due to the phasing of the voltages there are no significant sneak (parallel) paths.) When Q2 is turned off, the energy stored in the inductors (e.g., F1, F2 and windings W1, W2) is released into the DC bus (across power lines 220 and 222) as shown in FIG. 5. The energy stored in the inductors and windings (e.g., F1, F2 and W1, W2) causes a current to pass through diodes D1 and D4 and to charge capacitors C1 and C2 in this PWM phase. In general, current from each generator winding phase passes through two solid-state devices during each stage. These devices which include transistor switches and/or diodes have relatively fixed voltage drops which result in a fixed power loss to the system. The pulse width modulation of switches typically takes place several thousands of times per second. In all cases, solid-state switches are used to regulate the flow of power to/from the generator.

Figure 5:
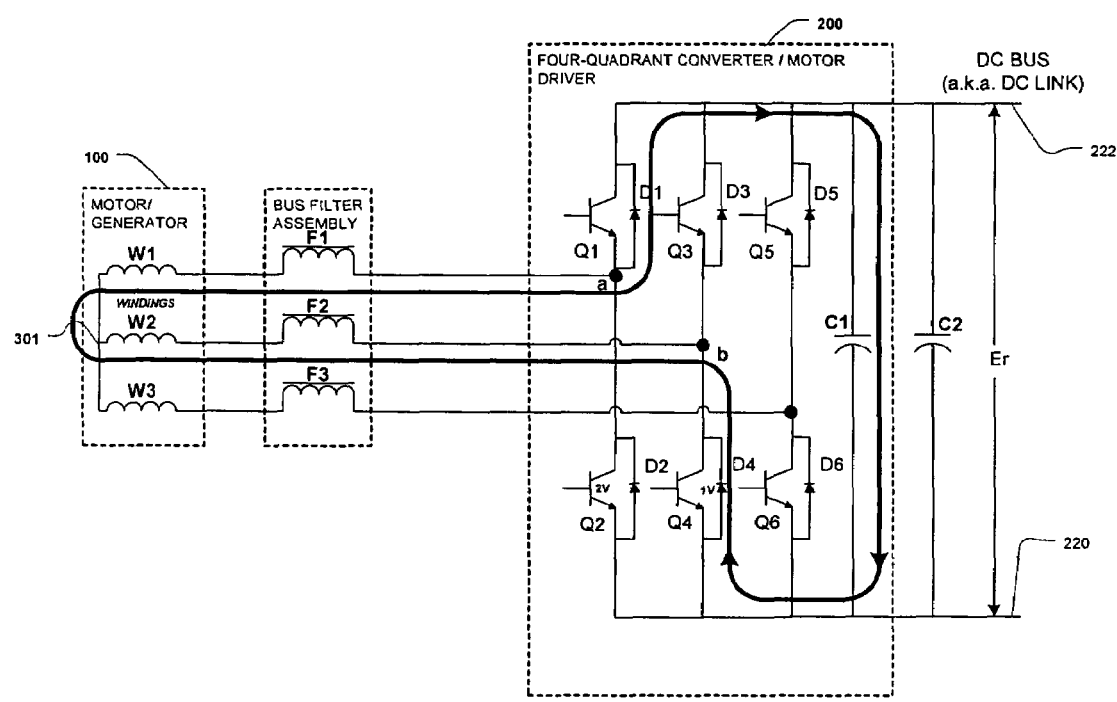

In the mode shown in FIG. 5, the inductor(s) dump their energy into the capacitor bank (at a higher voltage). This process of going from FIG. 4 to FIG. 5 is the PWM process that takes place, for example, at over 5000 times per second. FIG. 5 shows the current flow through the power stage of a pulse-width-modulated power converter for capacitor charging mode of the converter. In general, there's more loss in the "charge" mode when one transistor and one diode are on, than in the "boost" mode when two diodes are involved. This can change if the "charge" mode duty cycle is really short. It can also change if the converter is operated in a motoring mode in which there is no boosting and the system ends up "bucking". So, in general, the losses are greater when the transistors are on for high duty cycles.

Figure 6:
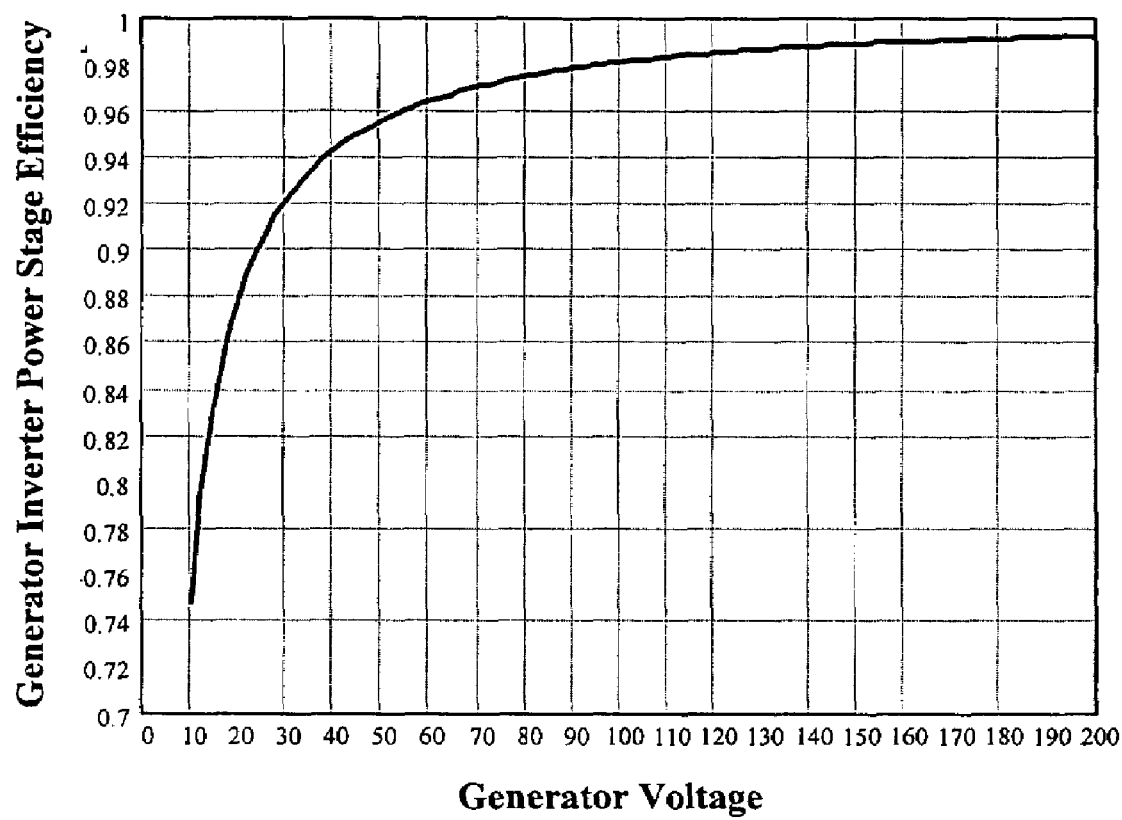
FIG. 6 is a plot showing the general relationship between generator output voltage and generator power converter power stage efficiency for a fixed current condition.

For the relatively high values of current encountered in this type of application: (a) the forward conduction voltage drop of the solid-state switches/transistors (the collector to emitter voltage, Vce, of a bipolar transistor or the source to drain voltage, Vds, of a MOSFET) is assumed to be generally fixed (e.g., may be assumed to be approximately 2 volts); and (b) the forward drop across the diodes may be assumed to be approximately 1 volt. Thus, a higher power conversion efficiency is achieved when the input and output voltages of the power converter are high (20 to 100 times the voltage drop of the switches/diodes). Conversely, a low power conversion efficiency is obtained when the input and/or output voltage is low. Generally, the efficiency of the generator power converter is a function of generator voltage, converter DC bus voltage, and power throughput. FIG. 6 illustrates the relationship of power converter efficiency as a function of generator voltage for a fixed current and DC bus voltage. As shown, the generator power converter efficiency decreases from more than 98% efficiency at elevated voltages to approximately 75% at generator voltages in the range of 10 volts.

The components of the PTO are typically sized to handle the high forces and velocities (and power) that can occur in heavy sea conditions. These forces and velocities can be an order of magnitude (or more) above those experienced in normal or low sea conditions. Similarly, the components of the PCS are sized to handle the high currents and voltages (and power) that result during heavy sea conditions. In normal and low sea conditions, the generator typically spins much slower than at its rated speed. The resultant voltage is proportionally lower. This lower voltage does not adversely affect the electrical efficiency of the generator, but it can adversely affect the efficiency of the power conversion system (PCS) because of the fixed voltage drops of the solid state devices in the power conversion system (e.g., power converter 200). For example, a 2V transistor forward conduction voltage drop is not overly significant when the generator voltage is 200V (only a 1% loss), but is significant when the generator voltage is 20V (a 10% loss). Given that two or more solid-state devices (switches and diodes) are conducting (on) at a time, the effect of device (switch or diode) conduction losses is non-trivial.

Applicants' invention resides in: (a) the use of an electric generator whose windings are formed of multiple independent sections of coils; and (b) to means for switching the interconnection of the coils so they may be reconfigured to maximize the efficiency of the power conversion system over a wide range of operating conditions.

Figure 7:
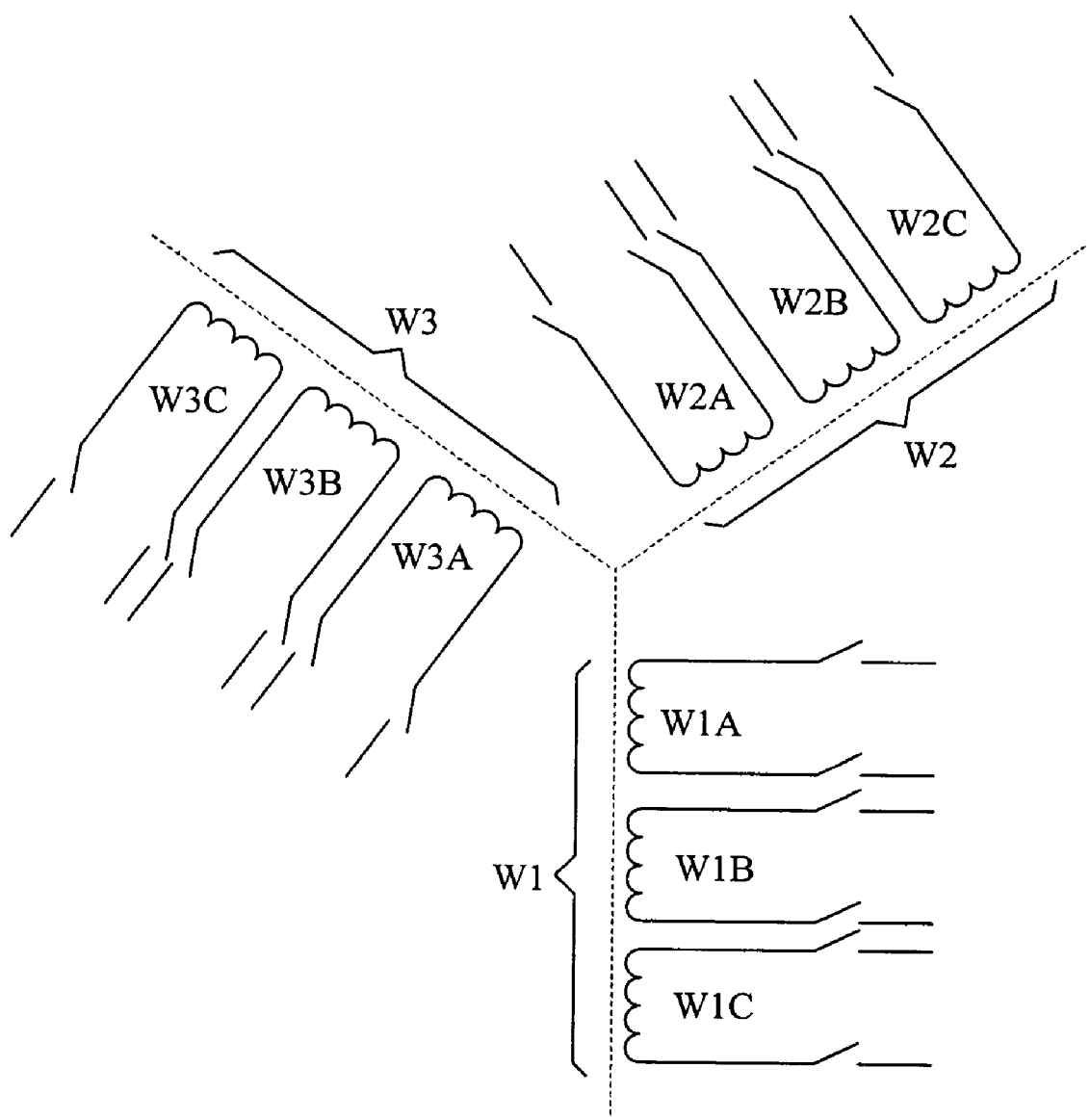
FIG. 7 is a simplified schematic diagram showing a generator with multiple winding configurations in accordance with the invention.

In a system embodying the invention a means is provided to selectively configure the generator windings to try to maintain the generator output voltage high relative to the power converter switch conduction voltage over the range of operation of the generator. FIG. 7 is a diagram which illustrates one embodiment of the invention. In FIG. 7 each one of the three windings w1, w2, w3, is shown to be formed with three sections, e.g., wia, wib, wic of a 3 phase generator. In accordance with the invention the different coil sections of each winding may be connected in parallel, or in series or in different parallel and series combinations. Thus, by way of example, FIG. 7A shows that the three coil sections of winding w1 may be interconnected via switches such that the three sections can be connected either: (a) in parallel as shown in FIG. 7B; (b) in series as shown in FIG. 7C; or (c) with two sections in parallel connected in series with the third section as shown in FIG. 7D.

It should also be noted that the invention may be realized using multiple generators conventionally wound on a common shaft.

In heavy sea conditions, the generator windings may be connected in parallel in order to keep the generator output voltage within limits while increasing the current handling capability of the generator. For this sea condition the windings shown in FIG. 7A would be interconnected as shown in FIG. 7B, with switches S2, S3, S5 and S6 closed and switches S1 and S4 open. In low sea conditions, when the generator (assuming it to be rotary) is spinning slowly, the generator windings would be connected in series in order to keep the generator output voltage well above the power converter switch conduction voltage. For this sea condition the windings shown in FIG. 7A would be interconnected as shown in FIG. 7C with switches S5 and S3 closed and switches S1, S2, S4 and S6 open. For an intermediate sea condition, two of the three windings could be connected in parallel with the combination connected in series with the third winding. For the intermediate sea condition the windings shown in FIG. 7A would be interconnected as shown in FIG. 7D with switches S2, S3 and S4 closed and switches S1, S5 and S6 open.

The number of switches needed would depend on the number of coil sections per winding and on the number of different configurations it is desired to configure. The switches selected for use are preferably the type of switches which have very low ohmic value, whereby the voltage drop across the switches is very low even for high currents. Accordingly, the switches may be relay contacts or any other suitable low impedance, low voltage drop switch.

Figure 8A:
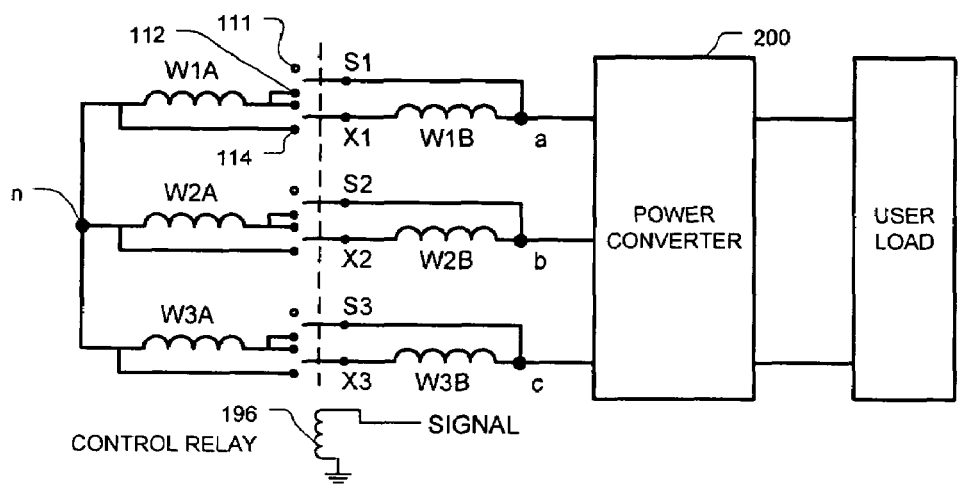
FIGS. 8A, 8B, 8C are simplified schematic diagrams showing other possible generator winding configurations in accordance with the invention.
Figure 8B:
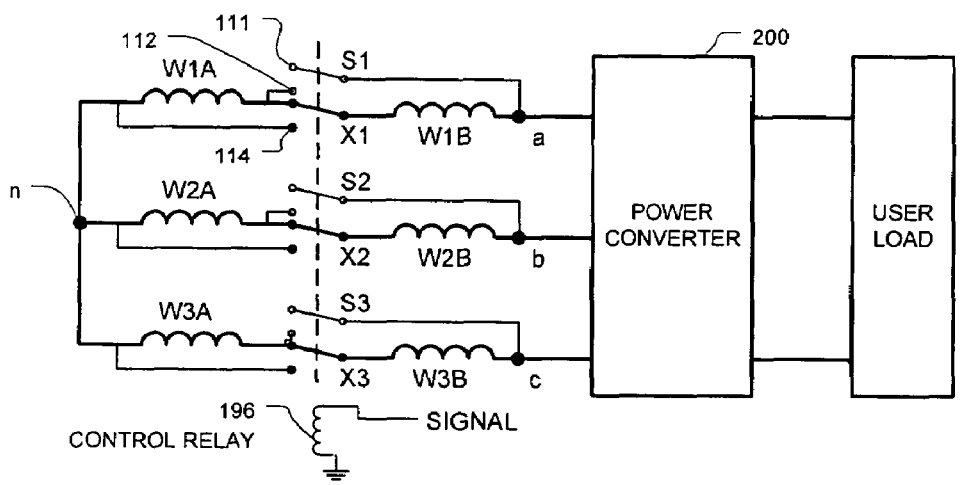
Figure 8C:
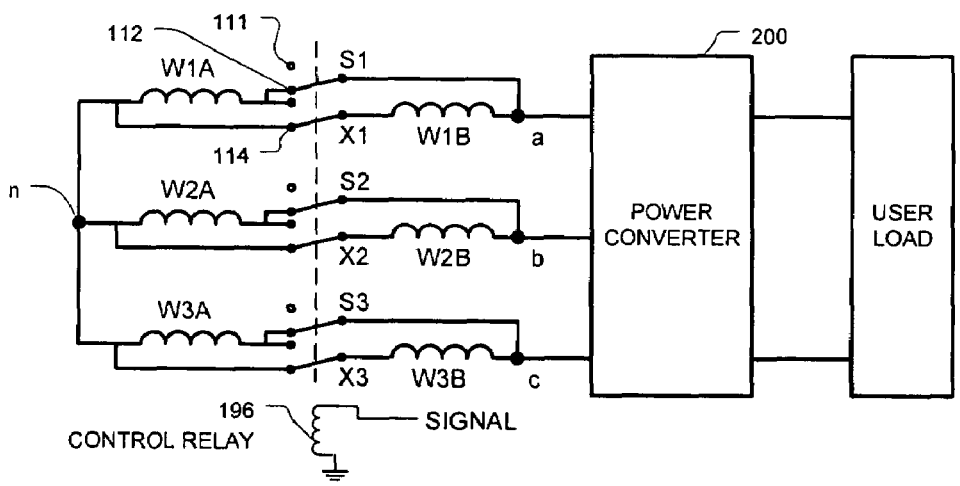

For ease of illustration, FIG. 8A shows an application where each winding (w1, w2, w3) of a 3 phase generator includes two coil sections (w1A and w1B, w2A and w2B, w3A and w3B) interconnected in a basic "wye" configuration. The two coil sections (WiA and WiB) of each winding are interconnected via a corresponding switch (Si) which permits the two coil sections to be connected in series as shown in FIG. 8B or in parallel as shown in FIG. 8C. The switches S1, S2, S3 may be relay switch contacts whose positions are controlled by signals applied to a control relay 196.

In FIG. 8B, the windings are interconnected in a series "wye" configuration by selectively placing switches S1, S2 and S3 such that: (a) coil sections W1A and W1B are connected in series between nodes "a" and "n"; (b) coil sections W2A and W2B are connected in series between nodes "b" and "n"; and (c) coil sections W3A and W3B are connected in series between nodes "c" and "n".

In FIG. 8C, switches S1, S2 and S3 are placed in positions which cause the coils of each winding to be connected in parallel. That is, (a) coil sections W1A and W1B are connected in parallel between nodes "a" and "n"; (b) coil sections W2A and W2B are connected in parallel between nodes "b" and "n"; and (c) coil sections W3A and W3B are connected in parallel between nodes "c" and "n".

FIG. 8A shows two coils per winding. However, as discussed above, to increase the range of voltage adjustment, the electric generator can be built with many coil sections per winding as shown in FIG. 7, with the many coil sections of each winding being interconnected to enable either series, or parallel, or any suitable series-parallel combination.

Figure 9A:
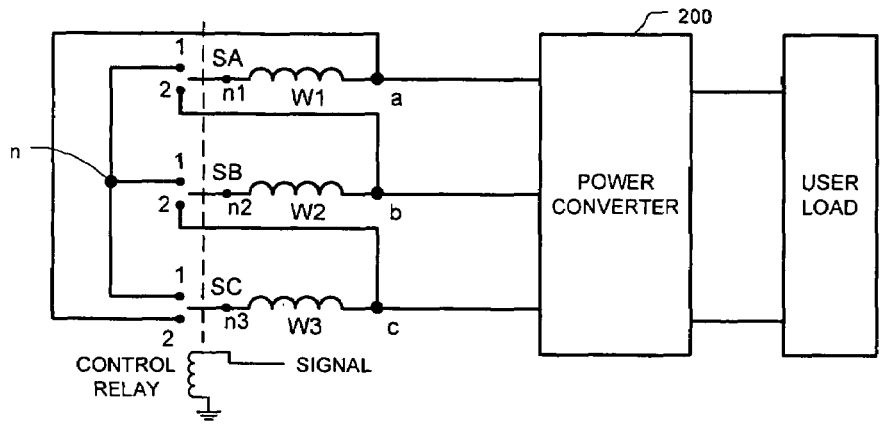
FIGS. 9A, 9B and 9C are schematic diagrams showing a switching arrangement for interconnecting the generator windings in a "wye" or "delta" configuration in accordance with the invention.

FIG. 9A illustrates a wye to delta or delta to wye switching arrangement to enable the generator output voltage to be varied or controlled with sea conditions, or any independent condition selected by a user. In FIG. 9A the generator windings may be switched by means of two position switches SA, SB, SC from a "wye" configuration (where one end of each winding (W1, W2, W3) is connected to an output terminal (a, b, c) and the other end (n1, n2, n3) of each winding is connected to a common "neutral" point) to a "delta" configuration (where each winding is connected across a pair of windings). in FIG. 9A each winding (W1, W2, W3) has one end (n1, n2, n3) which can be connected via switch SA, SB and SC to terminal 1 or to terminal 2. The other end of each winding (W1, W2, W3) is connected to a corresponding converter node (a, b, c).

Figure 9B:
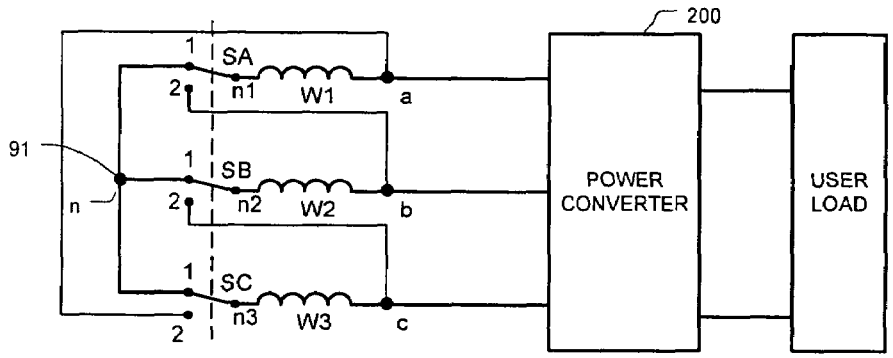

FIG. 9B shows that when SA, SB and SC are switched to the terminal 1 position the windings are interconnected into a wye configuration. That is, when terminals n1, n2 and n3 of windings w1, w2, and w3 are switched to terminal 1 and are all connected to line 91 which defines the central node, n, the three windings are connected in a wye configuration.

Figure 9C:
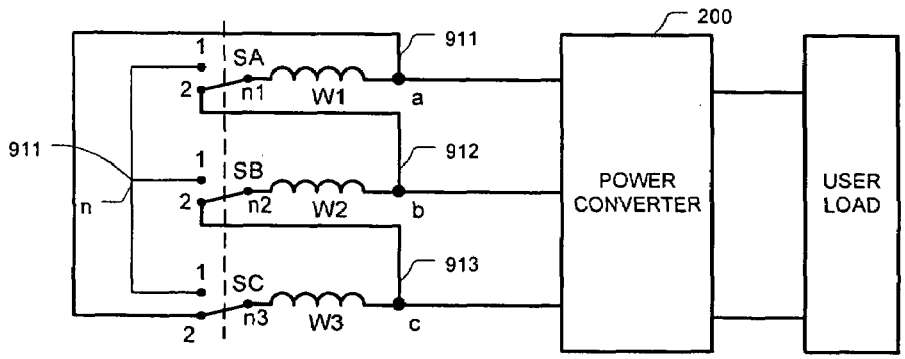

As shown in FIG. 9C, when switches SA, SB, SC are switched to position 2, node "a" is connected via line 911 to winding end n3, node b is connected via line 912 to winding end n1 and node c is connected via line 913 to winding end n2, and the three windings are interconnected in a delta configuration.

Each one of the windings may include a multiplicity of separate coil sections which can be interconnected in the different series-parallel combinations described above. Thus, the multiple coil sections of each winding can be interconnected in a number of different series parallel combinations and may also be subjected to a wye to delta (or delta to wye) transformation.

Figure 10:
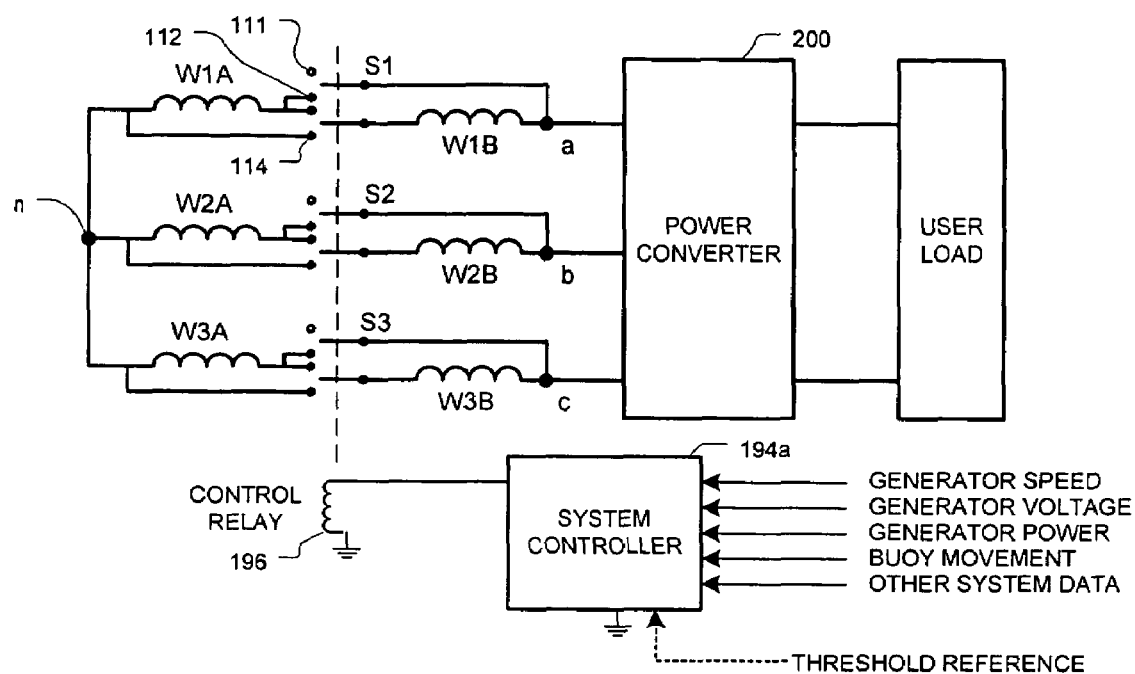
FIG. 10 is a simplified schematic diagram of a control network for controlling a control relay which controls the configuration of the windings.

Any system incorporating an electric generator whose coils may be selectively reconfigured may be programmed to automatically or semi automatically alter the winding configuration to increase the efficiency of the system. This may be achieved by incorporating into the system means for sensing one or more wave amplitude responsive parameters including generator speed, generator voltage, and/or generator power and/or sensors responsive to buoy movement and/or other system data. In the case of a WEC this could include sensing the amplitude and the frequency of the waves impinging on the WEC. As shown in FIG. 10 a variety of signals derived from various sensors (not shown) may be applied to a control network 194a, which may be biased by a threshold reference signal for processing. The control network 194a may be part of a computerized control network. If selected ones of these sensed speed/voltage/power signals are below a predetermined threshold (which would result in the production of a low, inefficient, output voltage), selected windings will be put in selected ones of some series configuration (see FIG. 8B) and/or a wye configuration (see FIG. 10A). If selected ones of these sensed average speed/voltage/power signals are above that (or another) threshold, selected windings will be put in some parallel configuration (see FIG. 8C) and/or a delta configuration (see FIG. 10B). The control system may incorporate hysteresis to keep from bouncing back and forth between modes.

It should be noted that the benefits of coil reconfiguration include: 1) rectifier (drive, converter) efficiency improvement, 2) generator ($I^2R$) efficiency improvement, 3) WEC wave-to-mechanical power efficiency improvement (i.e. impedance matching), and 4) combinations of the above for system efficiency improvement.

The invention has been illustrated for reconfiguring the windings as a function of the applied input force to improve the efficiency of the conversion of the electric generator AC output to a rectified DC level. However, it should be appreciated that the coil configuration may be controlled and altered to improve the over all efficiency of the power producing source (e.g., the entire WEC). By way of example, consider a wave energy converter in a small amplitude wave sea condition. Consider further that the output of the generator in this system is connected to a passive rectifier and thereby a certain generator voltage must be attained before power is extracted from the generator. In the low wave condition, the generator may impart a mechanical load on the WEC system in a way that does not optimize the extraction of power from the waves (i.e. there is an "impedance mismatch between the wave source and the WEC load). One could optimize the generator for this configuration, but then there would be an impedance mismatch and loss of power for the heavy sea case. Thus, the ability to reconfigure generator windings as a part of normal WEC operations allows one to tune the generator impedance in a way that maximizes power generation.

Figure 11:
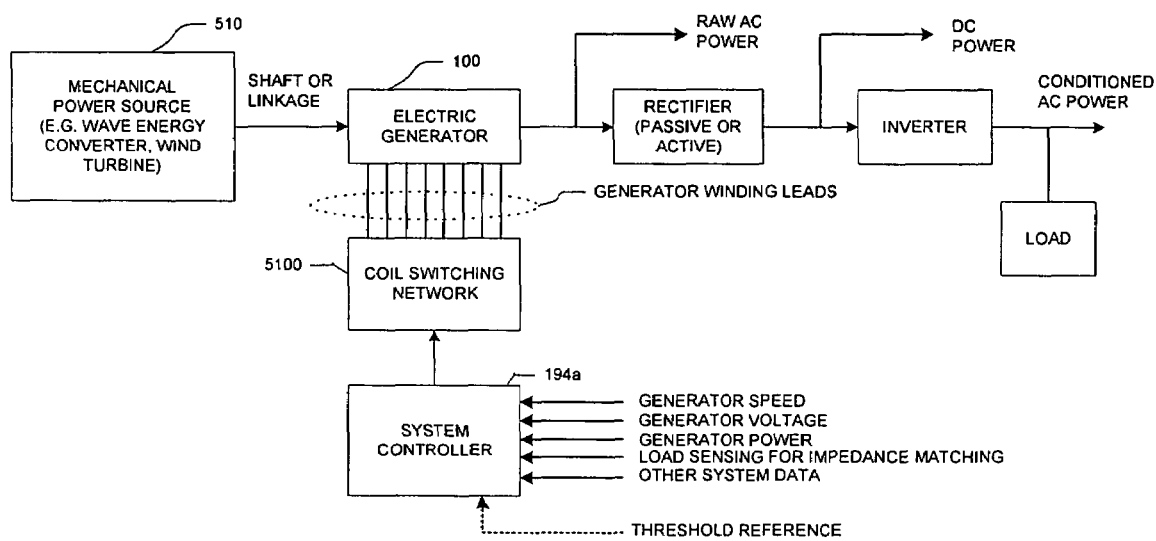
FIG. 11 is a simplified block diagram of a power generation system subject to highly variable conditions.

FIG. 11 illustrates that a mechanical power source 510 (which may be a WEC or a wind turbine or any mechanical transducer responsive to a widely variable external force) is used to drive an electric generator 100 whose output is fed to a rectifier which in turn powers an inverter feeding a load. The winding configuration of the electric generator is controlled by manipulating the coil switching network S100 via a system controller 194a whose inputs include signals for sensing various parameters and load sensing for ensuring impedance matching. This goes beyond sensing the voltage across the output of the electric generator and increasing or decreasing its output voltage to ensure that the conversion from AC to DC is done efficiently. Coil switching as anticipated and accomplished herein functions to optimize the response of the entire system.

The invention has been illustrated using an electric generator incorporated in a wave energy converter (WEC). It should be understood that this is by way of example only. The invention may be of use in any system where the voltage at the output of the generator varies over a wide range and it is desirable that the output voltage of the generator be greater than some predetermined value to ensure that the efficiency of converting the AC output voltage of the generator to a direct current (D.C.) voltage is optimized.

The invention has been illustrated for a system in which a power take off (PTO) device includes an electric generator with a winding comprised of multiple coil sections, where the multiple coil sections can be selectively interconnected in different combinations of parallel, series or parallel-series networks.

It should also be appreciated that the windings may be reconfigured to increase the efficiency of the entire power producing system.

What is claimed is:

1. A system comprising:
an electric generator having a winding for producing an alternating current (AC) voltage whose amplitude varies over a wide range as a function of external factors; said winding having a number N of independent coil sections, each coil section of said winding having first and second terminals; where N is an integer greater than 1; and switching means coupled to the terminals of the coil sections of the winding for selectively interconnecting the coil sections in one of: (a) a series combination; (b) a parallel combination; and (c) a series-parallel combination for increasing the efficiency of the system.

2. A system as claimed in claim 1, wherein the voltage produced by the electric generator is in response to a widely varying force applied to the generator whereby the amplitude of the voltage across the winding varies widely; and wherein said switching means selectively interconnects the coil sections in different configurations for producing a generator output voltage across first and second power terminals which tends to be within a desired range.

3. A system as claimed in claim 2, wherein the switching means functions to interconnect the coils in a configuration tending to produce a higher output voltage in response to a condition tending to produce an output voltage having a value below a predetermined level.

4. A system as claimed in claim 3, wherein a rectifying circuit is coupled across said first and second power terminals; and wherein said rectifying circuit has fixed voltage drops.

5. A system as claimed in claim 4, wherein the switching means configures the coil sections to produce a voltage at said first and second power terminals which is greater than the fixed voltage drops of the rectifying circuit.

6. A system as claimed in claim 2, wherein the switching means selectively reconfigures the windings of the electric generator to control the amplitude of the generator output voltage produced across said first and second power terminals.

7. A system as claimed in claim 2, wherein said switching means includes means for: (a) selectively interconnecting selected coil sections of the winding in series via low impedance connections for increasing the output voltage produced across the first and second power terminals; and (b) selectively interconnecting selected coil sections in parallel for limiting the amplitude of the voltage which would otherwise be produced across the first and second power terminals.

8. A system as claimed in claim 2 wherein the electric generator produces an alternating current (AC) voltage across the first and second power terminals; wherein said switching means determines what portion of the voltage developed by the electric generator appears across said first and second power terminals; and wherein a rectifying network is connected across said first and second power terminals for rectifying and converting the AC voltage to a direct current (DC) voltage.

9. A system as claimed in claim 8 wherein the rectifying network has a fixed voltage drop; and wherein the switching means interconnects the sections of the windings to cause the voltage across the first and second power terminals to exceed the fixed voltage drops.

10. A system as claimed in claim 2 wherein the electric generator is driven by a wave energy converter (WEC) which drives the electric generator and cause it to produce an output voltage which is a function of the amplitude of the waves.

11. A system as claimed in claim 10, wherein said electric generator is of the rotary type whose speed of rotation increases as a function of the amplitude of the waves and whose output voltage increases correspondingly; and wherein each section of the winding produces a voltage which is in phase with the voltages produced in the other sections of the winding.

12. A system as claimed in claim 11, wherein the AC voltage produced across the winding is applied to a rectifying circuit for producing a direct voltage; said rectifying circuit including semiconductor devices which exhibit fixed voltage drops when conducting.

13. A system as claimed in claim 2 wherein the electric generator includes multiple windings for producing multi phased voltages, each winding have multiple sections of coils, each coil section having first and second terminals; and wherein said switching means includes means for selectively interconnecting the coil sections of each winding via low impedance connections in: (a) series, (b) parallel or (c) a combination of series and parallel for controlling the amplitude of the output voltage produced by each winding.

14. A system as claimed in claim 13 wherein the switching means enables the multiple windings of the generator to be selectively interconnected in a "wye" or in a "delta" configuration.

15. A system as claimed in claim 2, wherein the switching means includes a relay with relay contacts, and wherein the relay contacts provide low impedance means for interconnecting the sections of each winding via a low ohmic impedance.

16. A system as claimed in claim 10 wherein the WEC includes a float and a column which move relative to each other in response to waves and wherein the switching means is responsive to at least one of the following: (a) the amplitude of the waves, (b) the relative motion of the float and column, (c) the speed of the generator and (d) the output voltage of the winding.

17. A system comprising:

an electric generator having multiple coil sections;

switches connected to said multiple coil sections; said switches for selectively interconnecting the multiple coil sections in one of a series configuration, a parallel configuration, or a series-parallel configuration; said switches interconnecting the coils across first and second power terminals for controlling the voltage produced across these power terminals and increasing the efficiency of the system.

18. A system as claimed in claim 17, wherein said electric generator is responsive to a widely varying force and wherein said switches are responsive to the widely varying conditions to reconfigure the coils so as to produce output voltages tending to counteract the conditions of the force.

19. A system as claimed in claim 18 wherein the electric generator includes several windings, with each winding having multiple coil sections; and wherein switches are connected to the multiple coil sections and to the windings for selectively enabling the reconfiguration of the coils of each winding and of the windings.

20. A system as claimed in claim 17 including a controller coupled to said switches for controlling the condition of the switches and the ensuing configuration of the coils of a winding.

21. A system as claimed in claim 19 including a controller coupled to said switches for controlling the condition of the switches and the ensuing configuration of the coils of a winding and of the windings.

22. A system as claimed in claim 18 wherein the electric generator is driven by a wave energy converter (WEC) which causes the generator to produce an output voltage which is a function of the amplitude of the waves; and further including a controller responsive to various selected ones of the conditions of the WEC and the waves for operating the switches and controlling their configuration for controlling the voltage produced across said first and second power terminals.

23. A system as claimed in claim 22 wherein said switches provide low impedance connections.

24. A system as claimed in claim 17 wherein the electric generator includes at least three windings to produce a three phase voltage and wherein each one of the three windings includes a multiplicity of coil sections, and wherein said switches selectively enable at least one of: (a) the coil sections to be connected in different combinations of series and parallel configurations; and (b) the windings to be connected in a wye configuration or in a delta configuration.

25. A system comprising:

an electric generator having multiple coil sections;

switches connected to said multiple coil sections; said switches for selectively interconnecting the multiple coil sections in one of a series configuration, a parallel configuration, or a series-parallel configuration; said switches interconnecting the coils across first and second power terminals for controlling the voltage produced across these power terminals and increasing the efficiency of the system;

power conversion and utilization means coupled across said first and second power terminals; and control means coupled to said switches for selectively determining an optimum configuration of the coils based on generator input conditions and load characteristics.

* * * * *